Feb. 1, 1955 J. STATSINGER 2,700,829
CIRCUIT COUPLING DEVICE
Filed Aug. 21, 1951 2 Sheets-Sheet 1

INVENTOR
JOSEPH STATSINGER
BY
Raymond A. Paquin
ATTORNEY

United States Patent Office 2,700,829
Patented Feb. 1, 1955

2,700,829

CIRCUIT COUPLING DEVICE

Joseph Statsinger, Brooklyn, N. Y., assignor to American Bosch Arma Corporation, a corporation of New York Application August 21, 1951, Serial No. 242,957

12 Claims. (Cl. 33—226)

This invention relates to a circuit coupling device, and has particular reference to a device in which the input signal disturbs the thermal equilibrium of the output circuit, thereby causing an electrical unbalance in the output circuit which results in the production of an output signal voltage proportional to the input signal.

The thermal integrator or coupling device is composed of a primary and secondary circuit, wherein two series connected similar resistors of the primary circuit (having low temperature coefficients) are thermally independent of one another but are each thermally coupled to a different one of a pair of series connected similar resistors, having high temperature coefficients, of the secondary circuit.

The series resistors of the primary circuit are connected across a center tapped constant alternating voltage power supply and, similarly, the secondary circuit is completed by connecting the secondary resistors across another center tapped constant alternating voltage power supply.

An input signal, of the same frequency as the primary power supply frequency is introduced between the power supply center tap and the junction point of the primary resistors producing a thermal unbalance in the primary circuit which is reflected into the secondary circuit as an unbalance in the values of the secondary resistors. The output signal, taken between the secondary power supply center tap and the junction point of the secondary resistors has a frequency equal to that of the secondary power supply, an amplitude proportional to the amplitude of the input voltage amplitude and is sensitive to the phase of the input signal.

A sudden change in the amplitude of the input signal results in an exponential change in the amplitude of the output signal which reaches a nearly constant value, substantially proportional to the input signal, after a time interval proportional to the time constant of the device.

In the following sentences the "period" of the input signal denotes the period of the variable component of the input signal amplitude and does not refer to the primary circuit power supply voltage. The period of the output signal may be correspondingly defined. Also, the "phase shift" refers to the phase relationship between the variable components of the output and input signals and does not involve the power supply voltages.

When the amplitude of the input signal is not constant, but varies regularly about a mean value with a period smaller than the time constant of the thermal integrator, the mean value of the output signal amplitude is proportional to the mean value of the input signal amplitude, while the variation of the output signal about the mean is greatly reduced.

If, however, the amplitude of the input signal varies with a long period, i. e. longer than the time constant of the thermal device, the amplitude of the output signal is proportional to the input signal amplitude and varies with a period equal to the input signal period.

In either case there is a phase shift of the output signal dependent on the relative values of the time constant of the thermal integrator and the period of the input signal.

The thermal integrator is applied to a gyro compass in the following manner: The output voltage of an electrical pick-off device, the amplitude of which is proportional to the displacement of a gravity pendulum hung from the follow-up or phantom gimbal ring of the compass is transmitted through two series connected thermal integrators of different time constants. The first thermal integrator has a low time constant and smooths the output voltage of the pickup device, attenuating the effects of pendulum vibration about the vertical. The second thermal integrator has a long time constant so that its output voltage lags the output of the first thermal integrator by approximately one quarter of the oscillation period of the gyrocompass. The output signals of the thermal integrators are connected in series to produce their difference voltage, and this difference voltage controls a torque motor on the horizontal axis of the gyro.

In this application, the second thermal integrator supplies the horizontal damping force which corresponds to that supplied in customary compasses by anti-pendulous means, causing the compass to settle on the meridian.

For a more complete understanding of the invention reference may be had to the following diagrams, in which Fig. 1 shows a preferred arrangement of the basic thermal unit;

Figure 1:
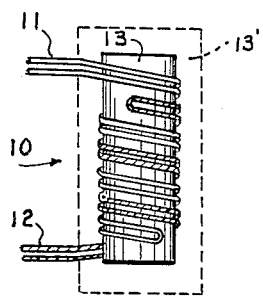

Fig. 1 illustrates one arrangement of the basic thermal unit 10 comprising resistance elements 11, 12 wound non-inductively on a common non-magnetic core 13 (such as ceramic for instance) and enclosed in container 13' which is preferably evacuated.

Resistor 11 has a negligible temperature coefficient of resistance while resistor 12 has a high temperature coefficient of resistance, and resistors 11, 12 are mounted within case 13' so as to be in close thermal contact without being electrically coupled. The term "close thermal contact" describes the condition in which the temperature variation of resistor 11 causes an identical temperature variation of resistor 12.

When a constant voltage (direct or alternating) is suddenly impressed across resistor 11, the temperature within thermal unit 10 rises exponentially to an essentially constant value. A sudden decrease in the applied voltage causes the temperature to approach a lower constant value, also following an exponential curve. The time constant of the thermal unit 10 is dependent on the thermal capacity of resistors 11, 12, core 13 and their mounting means within case 13', and the heat losses due to radiation, conduction and convection, and may be varied over a wide range by properly controlling these quantities. The final or steady state difference in temperature of resistors 11, 12 from the zero signal temperature is proportional to the amplitude of the applied voltage.

Figure 2:
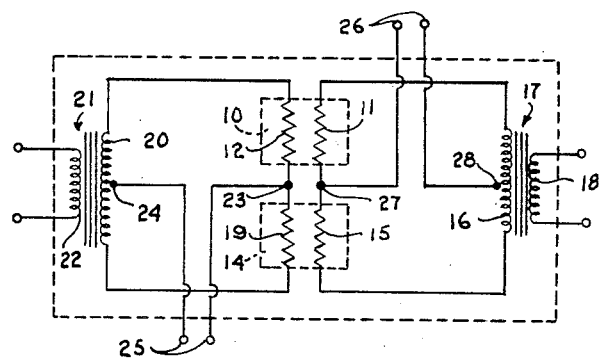
Fig. 2 is a schematic wiring diagram of the thermal integrator.

Fig. 2 shows a schematic wiring diagram of a thermal integrator circuit containing two similar thermal units 10 and 14. Resistor 15 of thermal unit 14, similar to resistor 11, is connected in series with resistor 11 and secondary winding 16 of transformer 17, the primary winding 18 of which is supplied with a constant alternating voltage. Resistor 19, of thermal unit 14, is similar to resistor 12 and is connected in series with resistor 12 and secondary winding 20 of transformer 21, the primary winding 22 of which is supplied by an alternating voltage, not necessarily of the same frequency as that supplying primary winding 18.

The voltage applied across resistors 12, 19 by transformer 21 is chosen to be of such value that the current in resistors 12, 19 is small and the self-heating of resistors 12, 19 is therefore negligible. When the temperatures of resistors 12, 19 are equal, there is no potential difference between junction point 23 of resistors 12, 19 and center tap 24 of secondary winding 20 since the values of resistors 12, 19 are equal and the voltages across resistors 12 and 19 are also equal.

An input signal voltage, of the same frequency as the supply voltage of transformer 17, is applied at input terminals 26 which are connected between junction point 27 of resistors 11, 15 and the center tap 28 of secondary winding 16 of transformer 17. When the amplitude of the signal voltage at terminals 26 is zero, the resistors 11, 15 are each heated to the same temperature since the same current flows in both resistors 11, 15, due to the voltage of transformer 17. Consequently there is no difference in temperature between resistors 12, 19 and there is no output signal at terminals 25. When the input voltage at terminals 26 is a constant amplitude alternating signal and is in phase with the supply voltage across resistor 11, for instance, the current in resistor 11 is greater than that for zero signal and the current in resistor 15 is smaller than that for zero signal voltage. There is, therefore, a temperature difference between resistors 11, 15 which is proportional to the amplitude of the signal voltage at terminals 26, and the temperature of resistor 11 is greater than that of resistor 15.

The difference in temperature between resistors 11, 15 causes an identical difference in temperature between resistors 12 and 19 resulting in a proportional difference in resistance between resistors 12 and 19 (due to the high temperature coefficient of said resistors) with the resistance value of resistor 12 being greater than that of resistor 19. There is, consequently, a greater voltage drop across resistor 12 than across resistor 19 so that a potential difference appears between junction 23 and center tap 24, alternating at the frequency of the supply voltage to transformer 21 and made available at output terminals 25 as the output signal of the thermal integrator.

For an input signal to terminals 26 of opposite polarity, resistors 15 and 19 are raised to the higher temperature, and the phase of the output signal at terminals 25 is reversed. The output signal is therefore proportional in amplitude to the amplitude of the input signal and is sensitive to the phase of the input signal.

It is understood that the amplitude of the output voltage at terminals 25 is not instantaneously proportional to the input signal amplitude since the temperature difference between thermal units 10, 14 increases exponentially with time. The differential equation describing the ratio of voltages at terminals 25 and 26 may be written as $E_o/E_i = K/(1+TD)$ where $E_o$ is the voltage at terminals 25, $E_i$ is the voltage at terminals 26, K is the voltage gain of the thermal integrator in the steady state. D is the differential operator $$\frac{d}{dt}$$

and T is the time constant of the thermal integrator. This expression is recognized as an exponential curve having a time constant T and a maximum value K.

Suppose that the envelope of the input signal voltage to terminals 26 pulsates about a relatively constant mean value with a period considerably smaller than the time constant of the thermal integrator. Since the amplitude of the input signal does not remain constant (or relatively constant) for an interval of time comparable to the time constant of the thermal integrator, the temperatures of the thermal units 10, 14 do not reach a steady state condition, and the amplitude of the output signal is not a simple proportion of the input signal amplitude. However, the output signal envelope also pulsates about a mean value, which is proportional to the mean value of the input signal, while the degree of pulsation present in the output signal is considerably less than the degree of pulsation in the input signal. The amount of attenuation of the pulsating component is dependent on its period and on the time constant of the thermal integrator.

If the maximum amplitude of the input signal varies slowly in comparison to the time constant of the thermal integrator (i. e. with a period of the order of one hour) the temperature of thermal units 10, 14 are allowed to reach a steady state, so that after a time interval of approximately four times the time constant has elapsed the temperature difference between resistors 11, 15 is substantially proportional to the amplitude of the signal input. The output signal envelope in either case lags the input signal envelope by an amount dependent on the time constant of the thermal integrator and the frequency of the input signal envelope.

The thermal integrator is applied to the gyro compass illustrated in part in Fig. 3 in the manner to be described in connection with Fig. 4.

Figure 3:
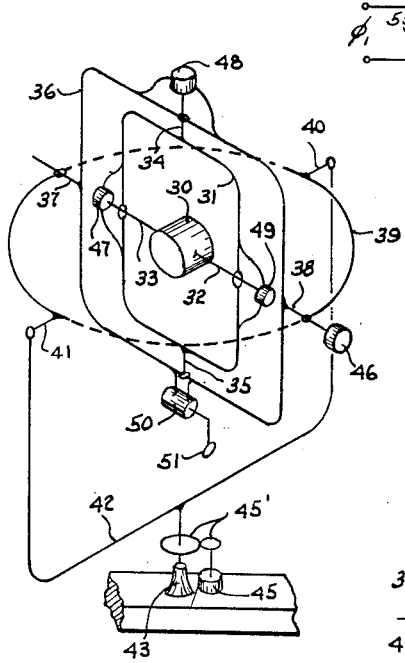
Fig. 3 is a functional diagram of a gyro compass, in part.

The theory and construction of the gyroscopic compass is well known, but for a clearer visualization of the application of the present invention to the gyro compass, the inner gimbal arrangement of a conventional gyro compass is shown schematically in Fig. 3.

A horizontal spin axis gyro 30 is supported in sensitive frame 31 by the horizontal shafts 32, 33 journaled therein. The sensitive frame 31 is supported by vertical shafts 34, 35 journaled in vertical follow-up or phantom frame 36 which is supported by horizontal gimbal ring 39. The horizontal gimbal ring 39 is supported by shafts 40, 41 in the vertical frame 42 which is journaled in support 43 carried by the normally stabilized platform 44.

Follow-up motor 45, carried by platform 44, is energized by pick-off device 48 whenever the plane of gimbal ring 31 and the plane of gimbal ring 36 are not coincident so that motor 45 drives frame 42 through gearing 45' and thereby drives gimbal ring 36 until the displacement of follow-up gimbal ring 36 from sensitive frame 31 is zero.

Pick-off device 47 energizes motor 46 whenever the plane of sensitive frame 31 is displaced from the plane of the spinning wheel of gyro 30 and motor 46 secured to gimbal 39 drives frame 36 through shaft 38 until the output of pick-off device 47 is zero.

In this manner, the plane of follow-up gimbal ring 36 is always kept parallel to the plane of the spinning wheel of gyro 30.

A pendulous link to earth is provided electro-magnetically through torque motor 49 energized by pick-off device 50 carried on follow-up frame 46, the output of which is proportional to the displacement of pendulum 51 from the plane of follow-up frame 36. Torque motor 49 applies a torque through shaft 32 to the gyro 30 causing precession of the gyro spin axis in azimuth, and in accordance with the laws of gyroscopics the spin axis of gyro 30 follows the familiar elliptical path in the absence of damping means.

Damping means in common usage today consist of antipendulous devices either mechanically or electro-magnetically linked to the gyro. For a description of damping produced with electro-mechanical coupling using a second heavily damped (or anti) pendulum and pick-off device (the output of which controls motor 49 jointly with pickup device 50) reference may be had to co-pending application Serial No. 128,366 filed November 19, 1949, now Patent No. 2,677,194, granted May 4, 1954, entitled "Gyro Compass."

The present invention replaces the second pendulum or other antipendulous device and provides the damping means for the gyro compass by effectually increasing and decreasing the pendulous factor of the pendulum 51 during appropriate periods of time.

Figure 4:
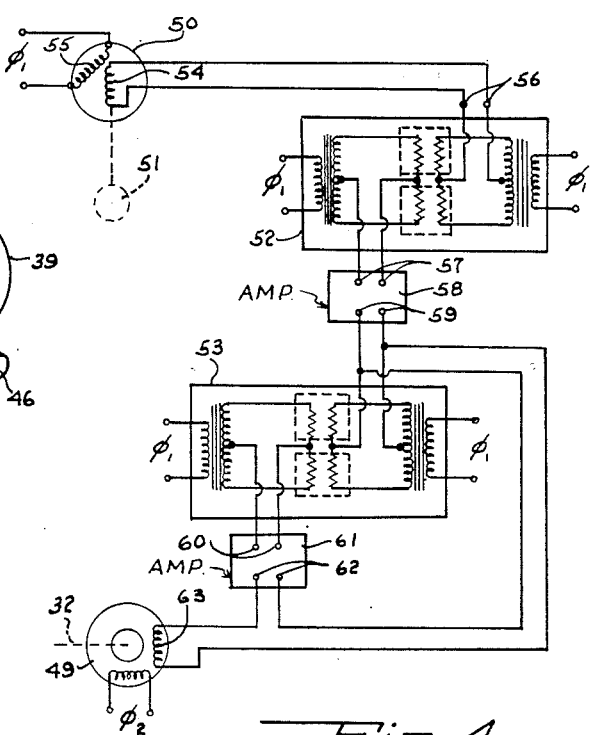
Fig. 4 shows the electrical circuit in which the thermal integrator is used in the gyro compass.

With reference to Fig. 4 the two phases of a 400 cycle constant alternating voltage is designated by $\phi_1$ and $\phi_2$. The thermal coupling members or integrators 52, 53 are similar in construction to the thermal integrator of Fig. 2, but have widely different time constants. The time constant of integrator 52 is approximately one minute while thermal integrator 53 has a time constant of approximately twenty minutes.

Pendulum 51 displaces the rotor winding 54 of pick-off device 50, the stator winding 55 of which is energized by $\phi_1$ so that the amplitude of the output voltage of rotor winding 54 is proportional to the displacement of pendulum 51 from the plane of follow-up frame 36.

Pendulum 51 may vibrate about the true vertical due to pitching and rolling motion of the vehicle carrying the compass, for example. This motion is evidenced in the output signal of pick-off device 50 as a pulsation in the substantially constant 400 cycle output (actually varying with a period of the gyro oscillation, on the order of eighty minutes) having a period equal to that of the pendulum vibration, approximately 10 or twenty seconds. If used to energize torque motor 49 directly the pulsating signal produces an undesirable wandering of the gyro 30 spin axis.

The output voltage of rotor winding 54 is therefore applied to input terminals 56 of thermal integrator 52, and in accordance with the description of operation made with reference to Fig. 2, the output voltage of thermal integrator 52, applied to input terminals 57 of amplifier 58, is a smoothed, integrated value of the input voltage and the amplitude of the output voltage is proportional to the mean displacement of pendulum 51 from the plane of follow-up gimbal ring 36. The phase lag of the signal envelope introduced by the thermal integrator 52 does not affect the operation of the gyro compass unfavorably. In this manner the undesirable signals due to the vibration of the pendulum 51 are attenuated, and the ultimate disturbance of the gyro spin axis is reduced.

The amplitude of the output voltage of amplifier 58, at terminals 59, is therefore substantially proportional to the mean displacement of pendulum 51 from the plane of follow-up gimbal ring 36.

The output of amplifier 58 is applied to thermal integrator 53, which has a long time constant, so that the output of thermal integrator 53, applied to input terminals 60, of amplifier 61 lags the signal input by about twenty minutes or by one quarter of a cycle of gyro oscillation about the meridian (approximately). The output signal of thermal integrator 53 is amplified in amplifier 60, the output terminals of which are designated by numeral 62.

Terminals 59 and 62 are connected in series with control field winding 63 of torque motor 49 so that the amplitude of the voltage at control field winding 63 is the algebraic difference of the voltages at terminals 59 and 62, while the main field winding 64 of motor 49 is energized by $\phi_1$ of the A. C. supply.

Briefly, the operation of the gyro compass equipped with thermal integrators, as in Fig. 4, is as follows:

The rotation of the earth produces an apparent motion of the gyro 30 spin axis in elevation, causing displacement of follow-up gimbal ring 36 from the vertical in the usual manner, resulting in displacement of pendulum 51 from the plane of follow-up gimbal ring 36.

The consequent output voltage of rotor winding 54 transmitted through thermal integrator 52 energizes control field winding 63 of motor 49 (disregarding for the moment the voltage at terminals 62) causing motor 49 to apply torque to gyro 30, through shaft 32, resulting in precession of the gyro spin axis in azimuth towards the meridan. As the axis precesses beyond the meridian the apparent motion of the gyro spin axis in elevation reverses resulting in a reduction of the output of pick-off device 50 and a reduction of precessing torque applied by motor 49. Without damping, the spin axis follows the familiar elliptical pattern, oscillating continuously about the meridian.

However, the output of thermal integrator 53, lags the output of pick-off device 50 by approximately twenty minutes or by one quarter of the period of oscillation of the gyro about the meridian. As the gyro spin axis approaches the meridian, the voltage at terminals 62 effectually increases the effect of pendulum 51 so that the rate of precession towards the meridian is increased, and for motion away from the meridian, the voltage at terminals 62 decreases the effect of the pendulum 51 so that the rate of precession of the gyro spin axis is reduced, resulting in settling the gyro spin axis on the meridian.

Figure 5:
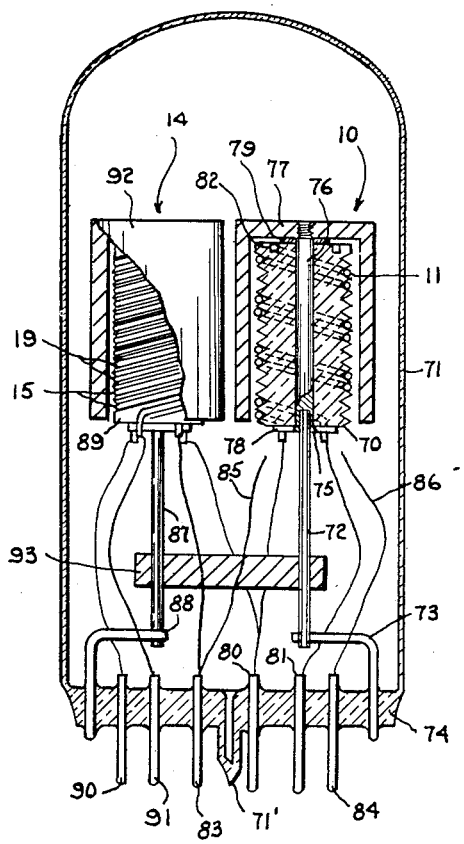
Fig. 5 is a view, partly in section, showing the preferred construction of a long time constant thermal device.

The preferred construction of a long time constant thermal coupling device is shown in Fig. 5. Here, one thermal unit 10 is shown in section while the other thermal unit 14 is shown with the heat absorbing shield partly broken away to present two views of similar units. The lead-in wires or pins protruding from the base of the envelope are intended to be received by a standard vacuum tube socket although, in the interest of clarity, the distances between the pins have been distorted in Fig. 5.

The thermal unit 10 is built about the porcelain or ceramic body 70, having quadruple threads thereon, which is supported within the evacuated glass envelope 71 by means of supporting tube 72. The envelope 71 is evacuated through tube 71' which is then sealed off. The support 72 is welded onto one of the lead-in wires 73 which is firmly held in the base 74 of envelope 71, and its upper end is pressed into the hole 75 bored longitudinally in the shaft 76 about which the body 70 is formed. The upper end of shaft 76 is threaded to receive the aluminum shield 77 which is screwed thereon to urge core 70 against shoulder or spider 78 on shaft 76. The washer 79 maintains a small separation between shield 77 and core 70.

Two of the quadruple threads on the body 70 receive and retain the low temperature coefficient wire 11, one end of which is connected to lead in wire 80 while the other end is connected to lead in wire 81. It is seen that the wire 11 extends from lead in wire 80 to the lower face of body 70, along one of the threads to the upper face of body 70, through groove 82 to an adjacent thread on body 70, along that thread to the lower face of body 70 and down to the lead in wire 81. To preclude unwinding of the wire 11 from the body 70, the ends of the resistance wire 11 are doubled through holes (not shown) near the lower edge of the core 70 where the resistance wire 11 leaves the threads. A high-temperature coefficient resistor (not shown) is wound on the remaining threads of core 70 in a similar manner, and is connected to the lead-in wires 83 and 84 as indicated by the wires 85 and 86 respectively.

Unit 14 similar in all respects to unit 10 is supported by the tube 87 which is welded to the lead in wire 88. Low temperature coefficient resistor 15 is wound on the threaded ceramic core 89 and is connected to the lead-in wires 90 and 80. High temperature coefficient resistor 19 is also wound on the core 89 and is connected to the lead-in wires 83 and 91. Thus lead-in wire 80 is common to the low temperature coefficient resistors 11 and 15, and lead-in wire 83 is common to resistors 12 and 19. Core 89 and the resistors 19 and 15 are surrounded by the cup-shaped aluminum shield 92.

As resistor 11 is heated by a passage of current therethrough, the temperature of core 70 will tend to rise, thereby increasing the temperature and the resistance of the resistor 12. The temperature rise will follow an exponential curve, the time constant being controlled by the construction of the unit 10. In order to prolong the time constant, the aluminum shield 77 is used. This shield absorbs considerable heat energy before exhibiting appreciable temperature rise. Additionally the outside of the shield is silver plated so that the heat absorbed is retained by the shield and is not radiated thus. The temperature of the unit 10 rises slowly and a long time constant unit results. The aluminum shield 92 over the ceramic core 89 increases the time constant of the unit 14 is a similar manner.

A copper bar 93 extends between supporting tubes 87 and 72 in order to equalize the operating temperature of the units 10 and 14. The envelope 71 may possibly be oriented so that unit 10, for example, is closer to an external source of heat, and the prolonged exposure of the unit 10 raises the temperature of unit 10 above that of unit 14 so that, without the copper bar 93, an undesirable voltage is produced at the output terminals 25 for zero input signal at terminals 26 (of Fig. 2). The copper bar 93, however, equalizes the temperature of the units 10, 14 i. e. causes the temperature of one unit to approach that of the other when either unit is exposed to a source of heat other than that provided by the winding 11 or 15.

Figure 6:
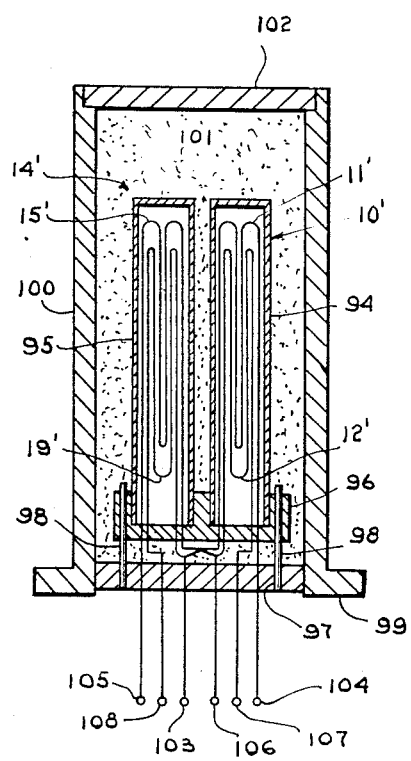
Fig. 6 is a sectional view of the preferred construction of a short time constant device.

A preferred type of short time constant device is shown in section in Fig. 6. The low temperature coefficient and high temperature coefficient windings 11' and 12' respectively, which comprise thermal unit 10', are doubled back and forth, and are squeezed into a tubular receptacle 94. Similarly the windings 15' and 19' comprising thermal unit 14' are squeezed into tubular receptacle 95. The yindings 11' and 12', and the windings 15' and 19' are thus in intimate thermal contact and the supporting core, such as core 13, of Fig. 1, is omitted. The receptacles 94 and 95 are secured to the plate 96 which is supported from the base 97 by the rods 98.

The base 97 is brazed, or otherwise fastened, to the flange 99 of cylinder 100. The space within cylinder 100 surrounding the thermal units 10' and 14', is filled with powdered mica 101, and the cover 102 is then brazed onto the top of cylinder 100 to complete an air-tight brass envelope about the thermal units 10' and 14'.

The windings 11' and 15' are jointly connected to lead-in wire 103 while the extremities of the windings are connected to lead-in wires 104 and 105 respectively. Similarly the windings 12' and 19' are jointly connected to lead-in wire 106 while the extremities of windings 12' and 19' are connected to lead-in wires 107 and 108 respectively. The powdered mica 101 aids in preventing heat loss from the units 10' and 14' so that the units heat up rapidly and thereby keeps the time constant of the device as short as possible.

From the foregoing it will be seen that means have been provided for obtaining all of the objects and advantages of the invention.

I claim:

1. In a device of the character described, a primary circuit, a secondary circuit, said primary circuit including a pair of series connected similar resistors, said secondary circuit including a pair of series connected similar resistors, the series resistors of the primary circuit being thermally independent of each other but thermally coupled to a different one of said pair of resistors of said secondary circuit, said series resistors of said primary circuit being connected across a center tapped constant alternating voltage power supply and said series resistors of said secondary circuit being connected across another center tapped constant alternating voltage power supply and a signal voltage applied between said center tap of the power supply of said primary circuit and the junction of the series transistors of said primary circuit, the output voltage of the device being taken between the center tap of the power supply of said secondary circuit and the junction of the series resistors of said secondary circuit.

2. In a device of the character described, a primary circuit, a secondary circuit, said primary circuit including a pair of series connected similar resistors having low temperature coefficients, said secondary circuit including a pair of series connected similar resistors having high temperature coefficients, the series resistors of the primary circuit being thermally independent of each other but thermally coupled to a different one of said pair of resistors of said secondary circuit, said series resistors of said primary circuit being connected across a center tapped constant alternating voltage power supply and said series resistors of said secondary circuit being connected across another center tapped constant alternating voltage power supply and a signal voltage applied between said center tap of the power supply of said primary circuit and the junction of the series transistors of said primary circuit, the output voltage of the device being taken between the center tap of the power supply of said secondary circuit and the junction of the series resistors of said secondary circuit.

3. In a device of the character described, a primary circuit, a secondary circuit, said primary circuit including a pair of series connected similar resistors, said secondary circuit including a pair of series connected similar resistors, the series resistors of the primary circuit being thermally independent of each other but thermally coupled to a different one of said pair of resistors of said secondary circuit, said series resistors of said primary circuit being connected across a center tapped constant alternating voltage power supply and said series resistors of said secondary circuit being connected across another center tapped constant alternating voltage power supply, and a signal voltage applied between said center tap of the power supply of said primary circuit and the junction of the series resistors of said primary circuit, the output voltage of the device being taken between the center tap of the power supply of said secondary circuit and the junction of the series resistors of said secondary circuit each of said resistors comprising an insulating body portion having quadruple threads thereon, within an evacuated envelope and a shield at least partially surrounding said body and threads.

4. In a device of the character described, a primary circuit, a secondary circuit, said primary circuit including a pair of series connected similar resistors, said secondary circuit including a pair of series connected similar resistors, the series resistors of the primary circuit being thermally independent of each other but thermally coupled to a different one of said pair of resistors of said secondary circuit, said series resistors of said primary circuit being connected across a center tapped constant alternating voltage power supply and said series resistors of said secondary circuit being connected across another center tapped constant alternating voltage power supply, and a signal voltage applied between said center tap of the power supply of said primary circuit and the junction of the series resistors of said primary circuit, the output voltage of the device being taken between the center tap of the power supply of said secondary circuit and the junction of the series resistors of said secondary circuit each of said resistors comprising a body of insulating material, a conducting member extending through said body, quadruple threads on said body and a shield at least partially surrounding said body.

5. In a device of the character described, a primary circuit, a secondary circuit, said primary circuit including a pair of series connected similar resistors, said secondary circuit including a pair of series connected similar resistors, the series resistors of the primary circuit being thermally independent of each other but thermally coupled to a different one of said pair of resistors of said secondary circuit, said series resistors of said primary circuit being connected across a center tapped constant alternating voltage power supply and said series resistors of said secondary circuit being connected across another center tapped constant alternating voltage power supply, and a signal voltage applied between said center tap of the power supply of said primary circuit and the junction of the series resistors of said primary circuit, the output voltage of the device being taken between the center tap of the power supply of said secondary circuit and the junction of the series resistors of said secondary circuit each of said resistors comprising a body of insulating material, a conducting member extending through said body, quadruple threads on said body and an aluminum shield at least partially surrounding said body.

6. In a device of the character described, a primary circuit, a secondary circuit, said primary circuit including a pair of series connected similar resistors, said secondary circuit including a pair of series connected similar resistors, the series resistors of the primary circuit being thermally independent of each other but thermally coupled to a different one of said pair of resistors of said secondary circuit, said series resistors of said primary circuit being connected across a center tapped constant alternating voltage power supply and said series resistors of said secondary circuit being connected across another center tapped constant alternating voltage power supply, and a signal voltage applied between said center tap of the power supply of said primary circuit and the junction of the series resistors of said primary circuit, the output voltage of the device being taken between the center tap of the power supply of said secondary circuit and the junction of the series resistors of said secondary circuit said resistors each comprising windings within metallic envelopes.

7. In a device of the character described, a primary circuit, a secondary circuit, said primary circuit including a pair of series connected similar resistors, said secondary circuit including a pair of series connected similar resistors, the series resistors of the primary circuit being thermally independent of each other but thermally coupled to a different one of said pair of resistors of said secondary circuit, said series resistors of said primary circuit being connected across a center tapped constant alternating voltage power supply and said series resistors of said secondary circuit being connected across another center tapped constant alternating voltage power supply, and a signal voltage applied between said center tap of the power supply of said primary circuit and the junction of the series resistors of said primary circuit, the output voltage of the device being taken between the center tap of the power supply of said secondary circuit and the junction of the series resistors of said secondary circuit each of said resistors comprising a body of insulating material, a conducting member extending through said body, quadruple threads on said body and a shield at least partially surrounding said body and conducting members connecting said members which extend through said bodies.

8. In a device of the character described, a primary circuit, a secondary circuit, said primary circuit including a pair of series connected similar resistors, said secondary circuit including a pair of series connected similar resistors, the series resistors of the primary circuit being thermally independent of each other but thermally coupled to a different one of said pair of resistors of said secondary circuit, said series resistors of said primary circuit being connected across a center tapped constant alternating voltage power supply and said series resistors of said secondary circuit being connected across another center tapped constant alternating voltage power supply, and a signal voltage applied between said center tap of the power supply of said primary circuit and the junction of the series resistors of said primary circuit, the output voltage of the device being taken between the center tap of the power supply of said secondary circuit and the junction of the series resistors of said secondary circuit each of said resistors comprising a body of insulating material, a conducting member extending through said body, quadruple threads on said body and an aluminum shield at least partially surrounding said body and conducting members connecting said members which extend through said bodies.

9. In a gyro compass having a horizontal spin axis gyroscope supported by horizontal shafts in a vertical gimbal ring, said gimbal ring being adapted for rotation about a vertical axis within a stabilized follow up vertical gimbal ring, a pendulum carried by said stabilized gimbal ring and adapted to pivot about an axis substantially parallel to said shafts, a pick-off device actuated by said pendulum to produce a signal voltage proportional to the relative displacement between said pendulum and said stabilized gimbal ring, a torque motor carried by said first gimbal ring and connected to one of said shafts, a pair of series connected thermal coupling members of different time constants, said signal voltage being transmitted through said pair of series connected thermal coupling members, the first of said coupling members having a short time constant and the second of said coupling members having a long time constant, said torque motor being controlled by the difference in voltage between said coupling members.

10. In a gyro compass having a horizontal spin axis gyroscope supported by horizontal shafts in a vertical gimbal ring, said gimbal ring being adapted for rotation about a vertical axis within a stabilized follow up vertical gimbal ring, a pendulum carried by said stabilized gimbal ring and adapted to point about an axis substantially parallel to said shafts, a pick-off device actuated by said pendulum to produce a signal voltage proportional to the relative displacement between said pendulum and said stabilized gimbal ring, a torque motor carried by said first gimbal ring and connected to one of said shafts, a pair of series connected thermal coupling members of different time constants, said signal voltage being transmitted through said pair of series connected thermal coupling members, the first of said coupling members having a short time constant and the second of said coupling members having a long time constant, the output voltage of said coupling member having a long time constant lagging the output of said coupling member having a short time constant by approximately one quarter of the oscillation period of the gyro compass, said torque motor being controlled by the difference in voltage between said coupling members.

11. In a gyro compass having a horizontal spin axis gyroscope supported by horizontal shafts in a vertical gimbal ring, said gimbal ring being adapted for rotation about a vertical axis within a stabilized follow up vertical gimbal ring, a pendulum carried by said stabilized gimbal ring and adapted to pivot about an axis substantially parallel to said shafts, a pick-off device actuated by said pendulum to produce a signal voltage proportional to the relative displacement between said pendulum and said stabilized gimbal ring, a torque motor carried by said first gimbal ring and connected to one of said shafts, a pair of series connected thermal coupling members of different time constants, said signal voltage being transmitted through said pair of series connected thermal coupling members, the first of said coupling members having a short time constant and the second of said coupling members having a long time constant, said torque motor being controlled by the difference in voltage between said coupling members, said coupling member having a long time constant supplying a horizontal damping force to said compass through said torque motor.

12. In a gyro compass having a horizontal spin axis gyroscope supported by horizontal shafts in a vertical gimbal ring, said gimbal ring being adapted for rotation about a vertical axis within a stabilized follow up vertical gimbal ring, a pendulum carried by said stabilized gimbal ring and adapted to pivot about an axis substantially parallel to said shafts, a pick-off device actuated by said pendulum to produce a signal voltage proportional to the relative displacement between said pendulum and said stabilized gimbal ring, a torque motor carried by said first gimbal ring and connected to one of said shafts, a pair of series connected thermal coupling members of different time constants, said signal voltage being transmitted through said pair of series connected thermal coupling members, the first of said coupling members having a short time constant and the second of said coupling members having a long time constant, the output voltage of said coupling member having a long time constant lagging the output of said coupling member having a short time constant by approximately one quarter of the oscillation period of the gyro compass, said torque motor being controlled by the difference in voltage between said coupling members, said coupling member having a long time constant supplying a horizontal damping force to said compass through said torque motor.

References Cited in the file of this patent

UNITED STATES PATENTS

| | | |
|---|---|---|
| 357,572 | Burton | Feb. 15, 1887 |
| 1,457,851 | Nesbit | June 5, 1923 |
| 1,693,898 | Horle | Dec. 4, 1928 |
| 2,377,506 | McWhirter et al. | June 5, 1945 |
| 2,419,948 | Haskins | May 6, 1947 |

FOREIGN PATENTS

| | | |
|---|---|---|
| 603,610 | Great Britain | June 18, 1948 |